Figure 1:
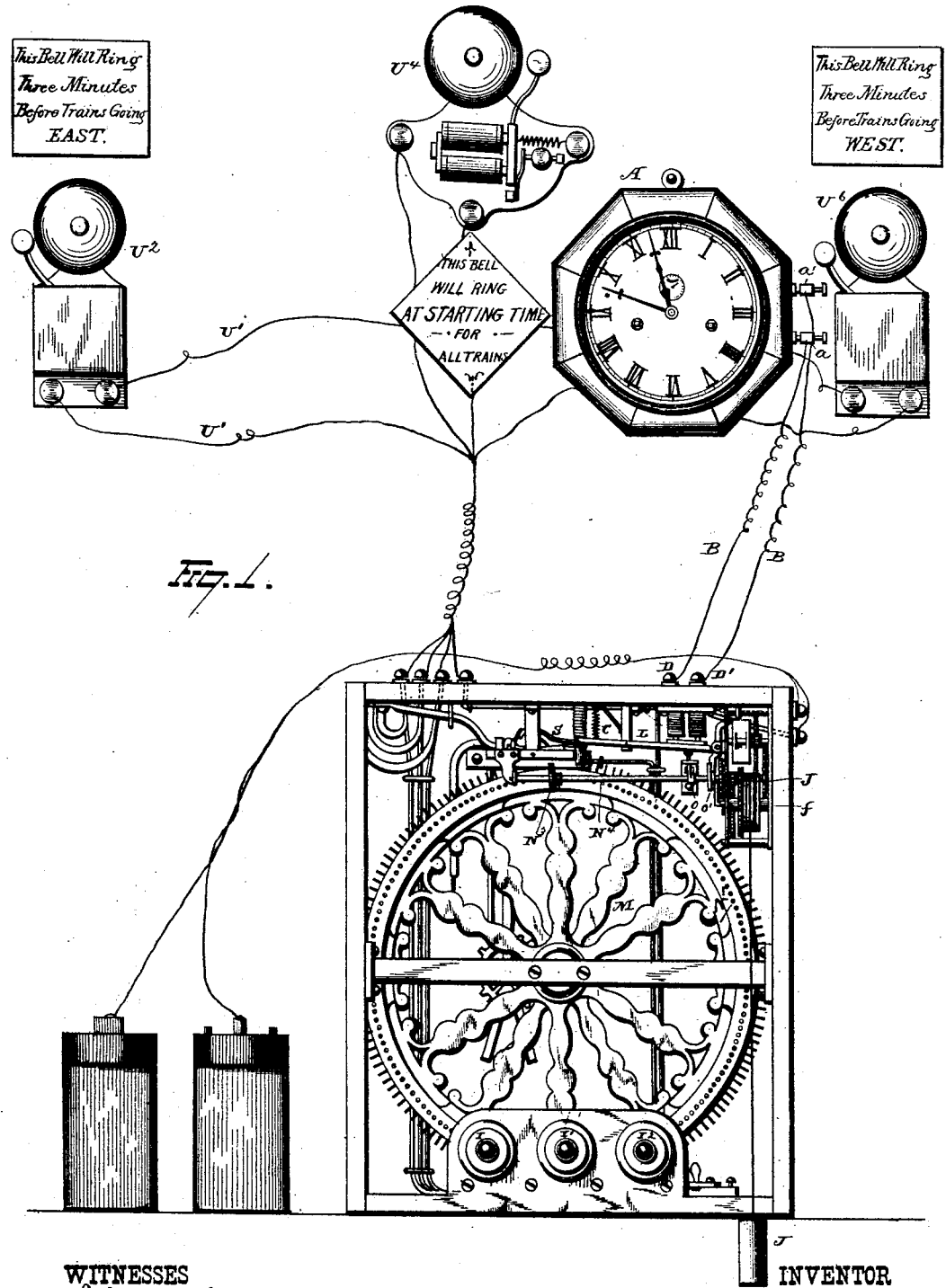

W. H. SHUEY.
Railway Signal Apparatus.

No. 229,921. Patented July 13, 1880.

9 Sheets—Sheet 1.

W. H. SHUEY.
Railway Signal Apparatus.

No. 229,921. Patented July 13, 1880.

WITNESSES
E. F. Nottingham
A. W. Bright

INVENTOR
Wm. H. Shuey.
By H. A. Seymour,
ATTORNEY

W. H. SHUEY.
Railway Signal Apparatus.
No. 229,921.    Patented July 13, 1880.
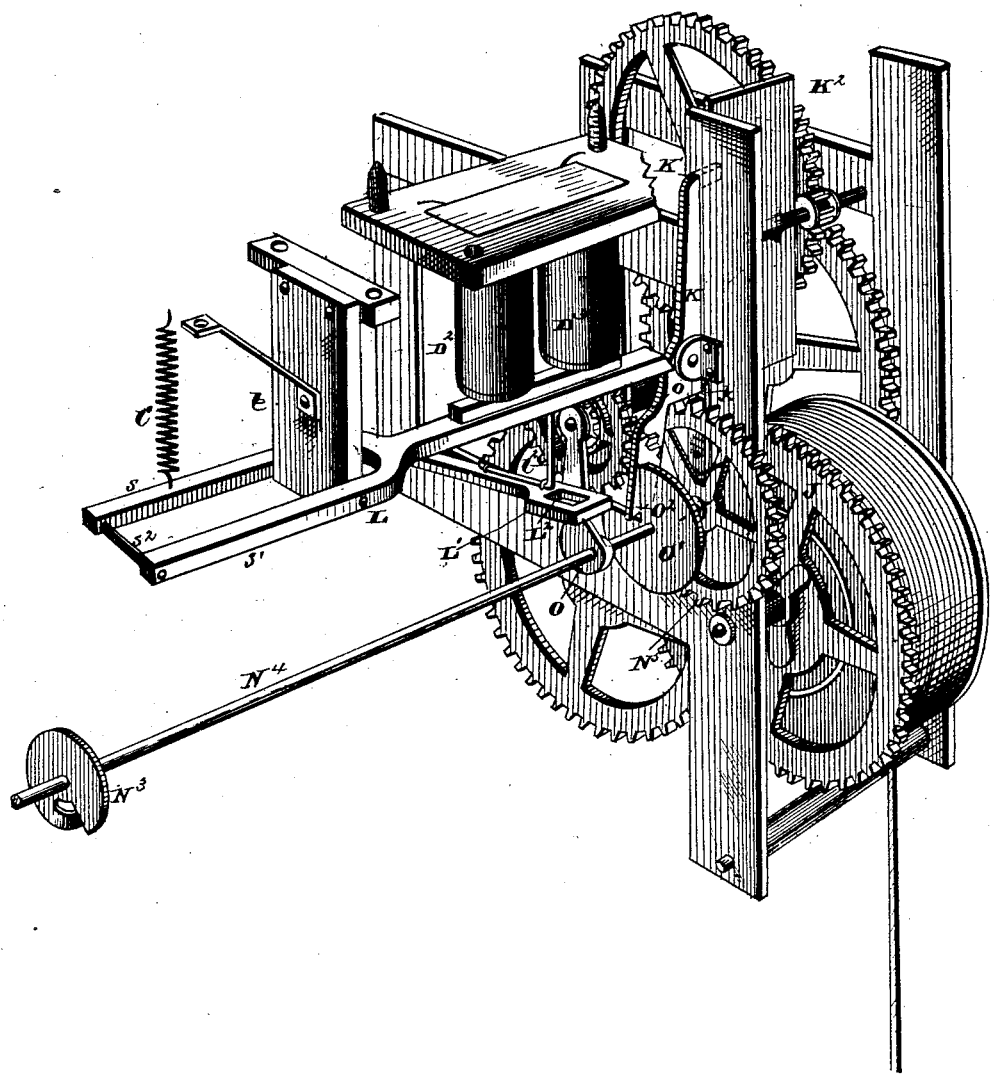

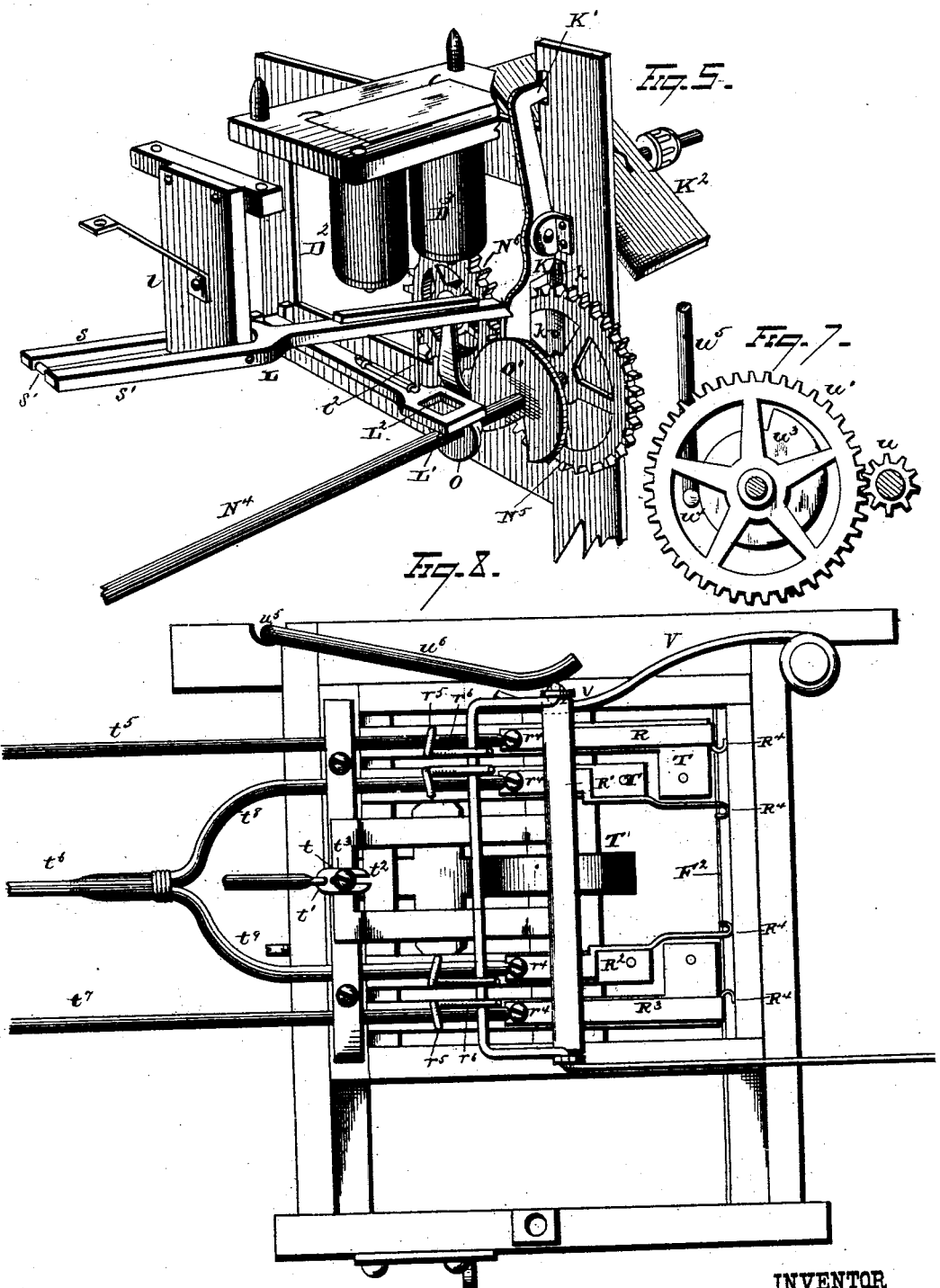

W. H. SHUEY.
Railway Signal Apparatus.
No. 229,921.　　　　　　　　　Patented July 13, 1880.
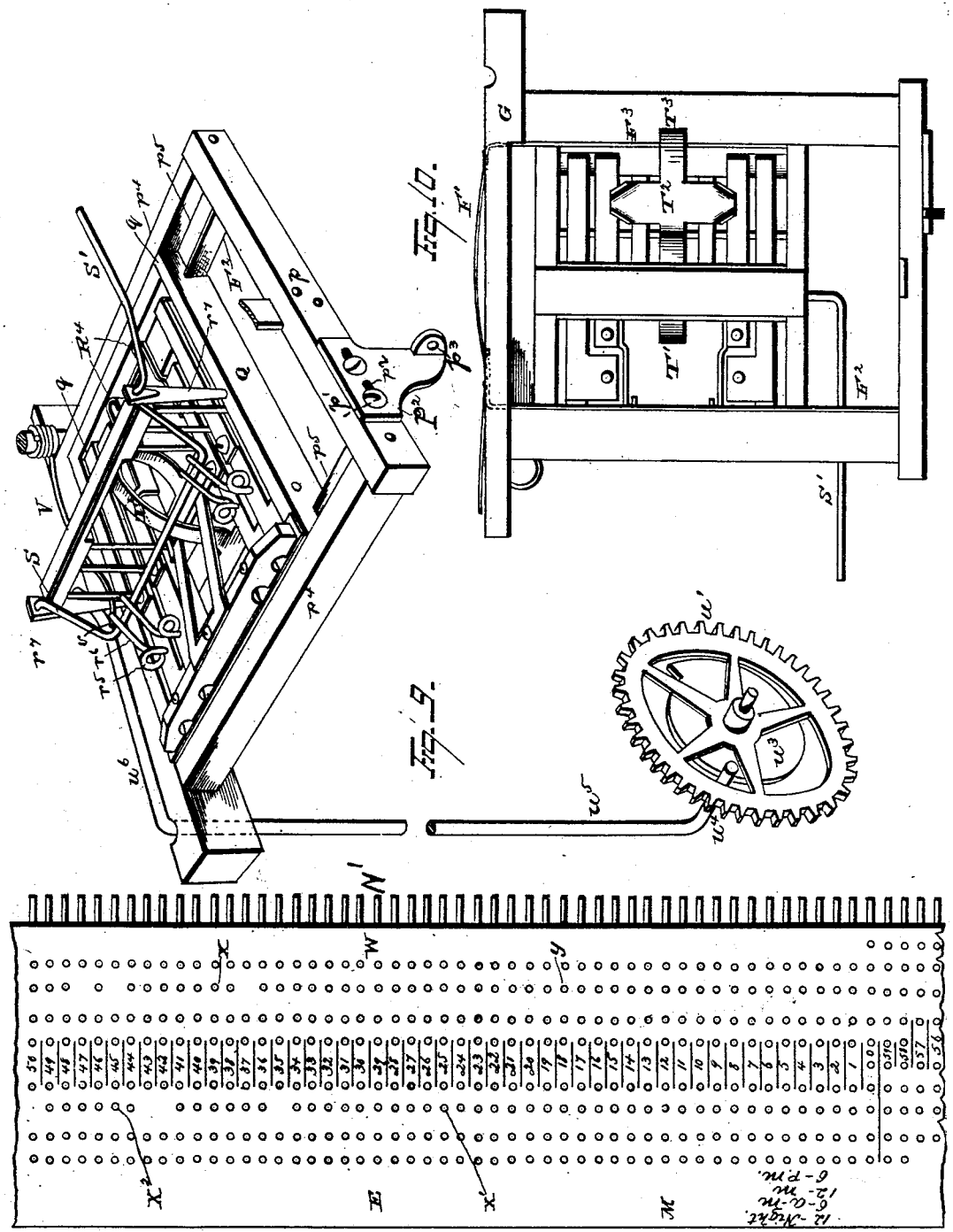

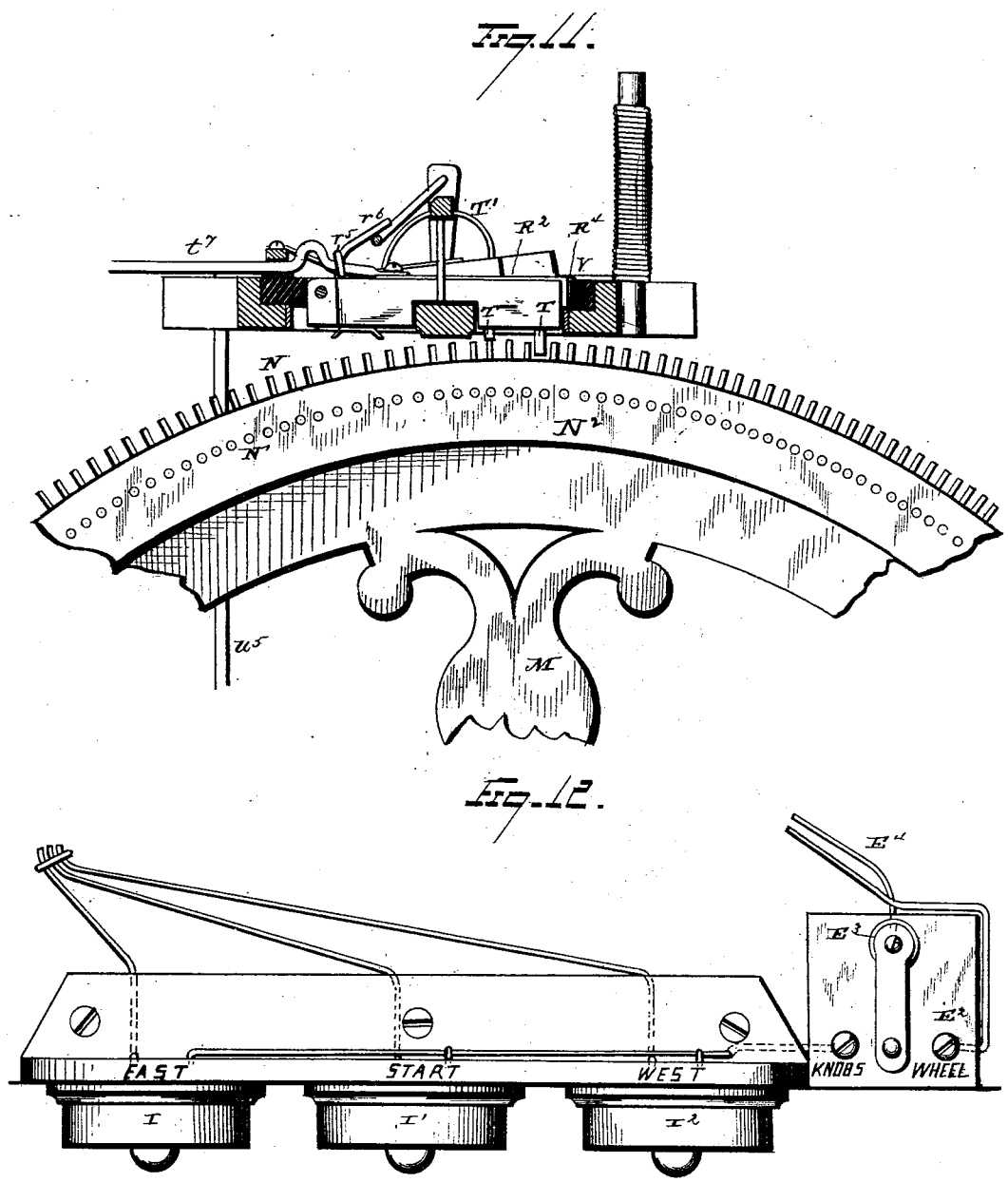

W. H. SHUEY.
Railway Signal Apparatus.

No. 229,921.　　　　　　Patented July 13, 1880.

WITNESSES
E. J. Nottingham
A. W. Bright

INVENTOR
Wm. H. Shuey.
By H. A. Seymour
ATTORNEY

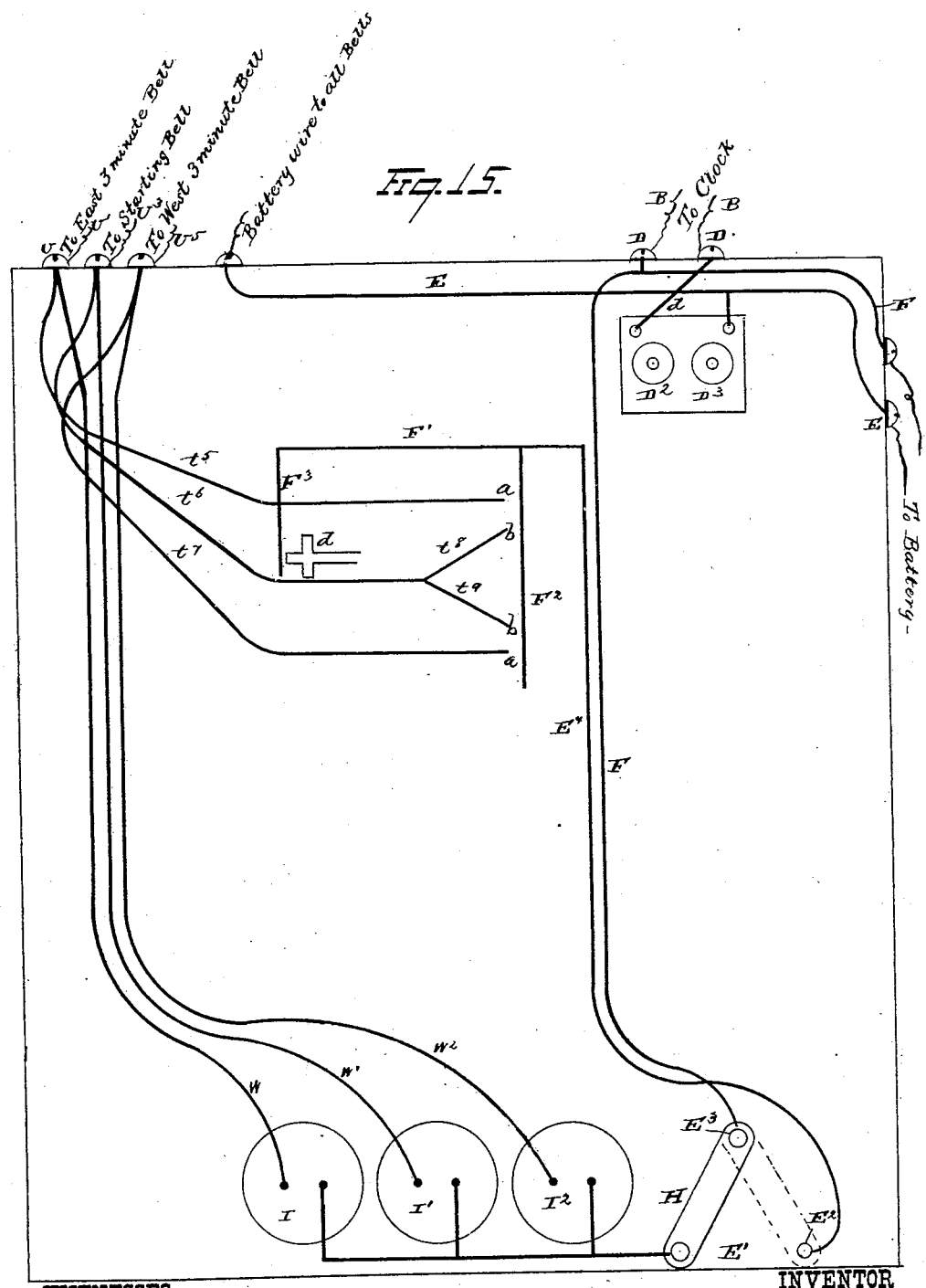

UNITED STATES PATENT OFFICE.

WILLIAM H. SHUEY, OF MINNEAPOLIS, MINNESOTA.

RAILWAY-SIGNAL APPARATUS.

SPECIFICATION forming part of Letters Patent No. 229,921, dated July 13, 1880.

Application filed February 3, 1880.

*To all whom it may concern:*

Be it known that I, WILLIAM H. SHUEY, of Minneapolis, in the county of Hennepin and State of Minnesota, have invented certain new and useful Improvements in Automatic Electric Time-Signaling Apparatus; and I do hereby declare the following to be a full, clear, and exact description of the invention, such as will enable others skilled in the art to which it pertains to make and use it, reference being had to the accompanying drawings, which form part of this specification.

My invention relates to an improvement in automatic electric time-signaling apparatus, the object being to combine with any approved time mechanism an electric signaling apparatus which shall be operated by and in unison with the time mechanism, and shall be of such construction and arrangement of parts that it will actuate one or more signals automatically at any predetermined periods of time throughout the twenty-four hours of each day.

To this end my invention consists, first, in the combination, with a time-piece provided with mechanism for breaking an electric circuit at any regular intervals of time, of a motor actuated by spring, weight, water, or other power, a wheel furnished with stop-pins corresponding in number to the number of minutes in twenty-four hours, said wheel being revolved by the motor, a circuit-closing device connected with the signaling devices and adapted to close the circuit at any moment of time indicated on the wheel, the stop-pin corresponding to the time of sounding the signal being withdrawn to allow of the automatic closing of the circuit, an armature connected at one end with the circuit-closers and electro-magnets located in the circuit embracing the time mechanism and adapted to regulate the movement of the stop-pin wheel and cause the motor connected therewith to impart an intermittent rotary movement thereto and move it through a space equal to the distance between any two adjacent stop-pins, showing each moment of time as indicated by the time mechanism.

My invention further consists, in the combination, with a wheel or cylinder provided with any desired number of removable stop-pins and mechanism for revolving said wheel in unison with a time-piece or regulator, of two or more circuit-closers located in the electric circuit embracing the signals, said circuit-closers being arranged to close the circuit at any moment of time during the twenty-four hours of a day by removing the stop-pin designating the minute at which it is desired to sound the signal.

My invention further consists, in a wheel provided with a continuous row of stop-pins extending around the wheel any desired number of times in a spiral form or line, of an automatic circuit-closer and mechanism for moving said circuit-closer transversely across the periphery of the wheel or cylinder.

My invention further consists in the several other combinations of parts and features of construction, as will hereinafter be described, and pointed out in the claims.

Figure 2:
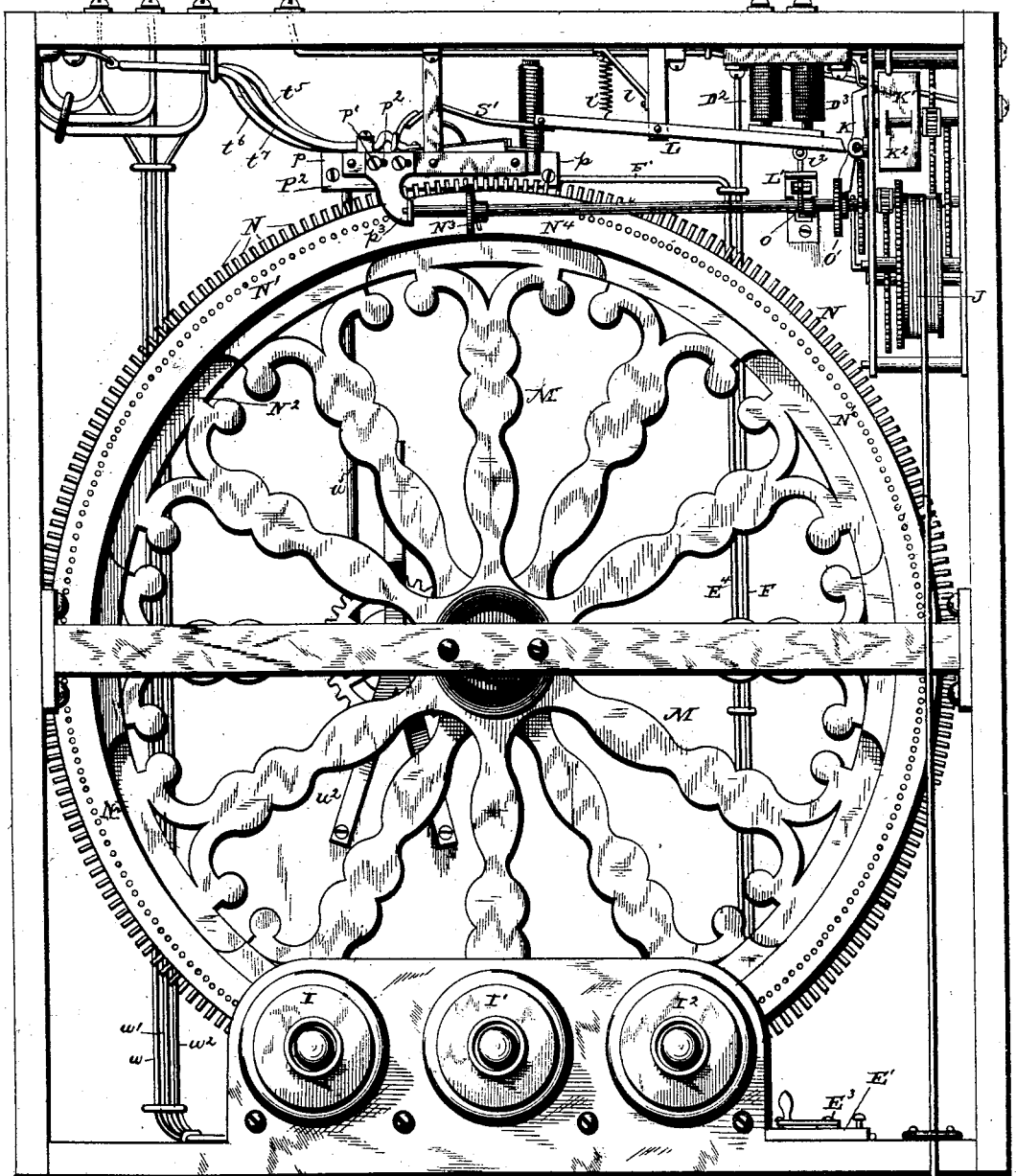
Figure 3:
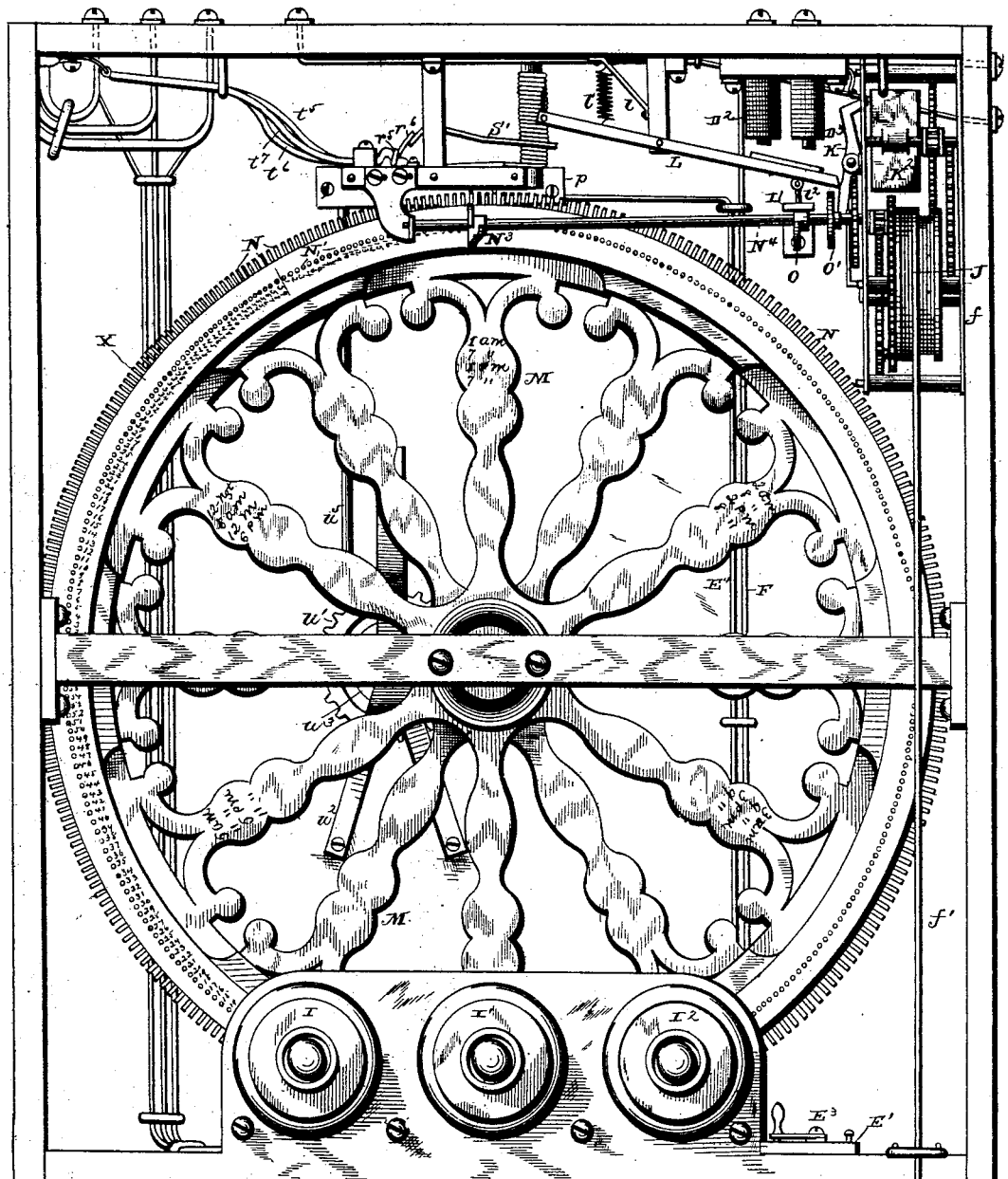
Figure 13:
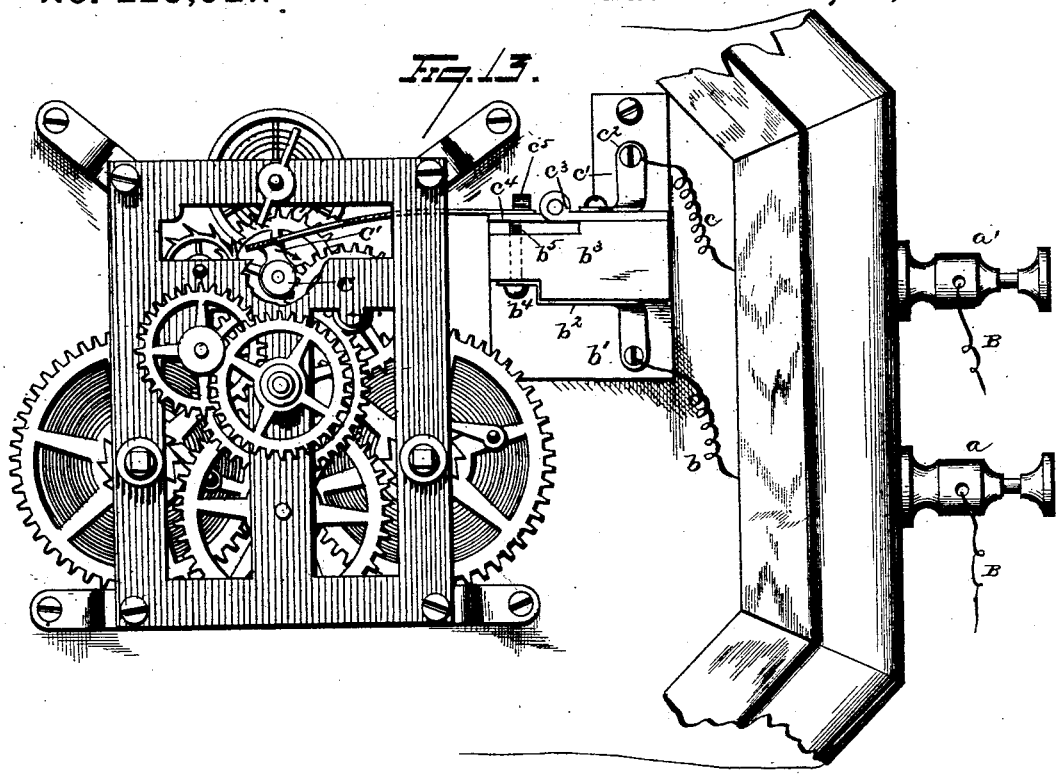
Figure 14:
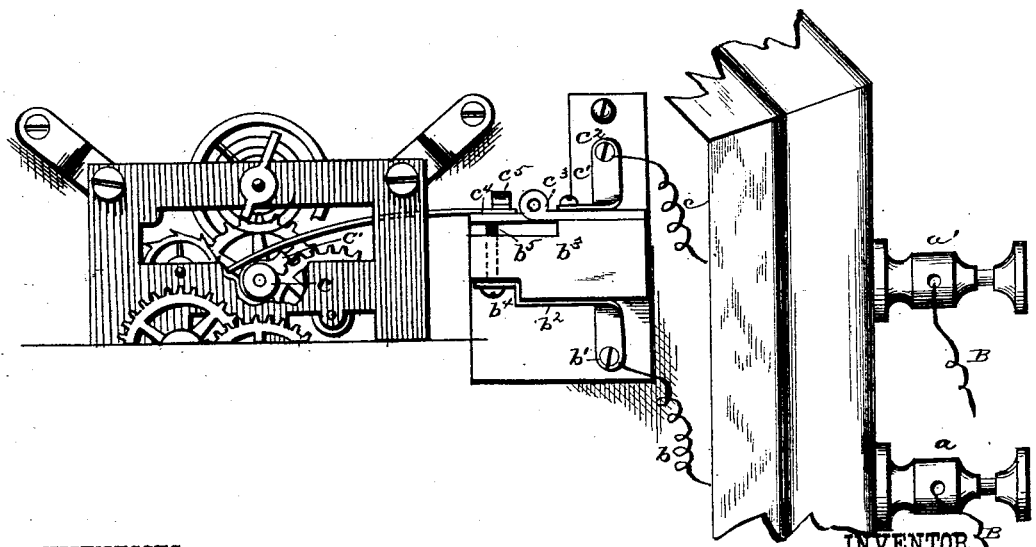

In the accompanying drawings, Figure 1 is a plan view of my improved apparatus, showing the connections between the parts when in actual operation. Fig. 2 is an enlarged view, in side elevation, of the automatic electric signaling apparatus, showing the position of the parts when the electric circuit is closed by the time mechanism. Fig. 3 is a similar view, illustrating the relative position of the parts when the electric circuit is broken by the time mechanism. Fig. 4 is a view, in perspective, of the devices for actuating the circuit-closers and stopping the motor throughout the desired intervals of time, the parts being represented in their relative position when the motor has been stopped by the release of the stop-lever from the slotted disk on the shaft operated by the motor. Fig. 5 is a view, in perspective, of the mechanism shown in Fig. 4, the parts being in their relative position when the electric circuit embracing the time mechanism has been broken and the motor for operating the stop-pin wheel is in operation. Fig. 6 is an edge view of a part of the wheel to which the stop-pins are secured. Fig. 7 is a detached view of the mechanism driven by the stop-pin wheel for reciprocating the circuit-closer frame. Fig. 8 is an enlarged plan view of the circuit-closer frame and supporting-guides. Fig. 9 is a view, in perspective, of the circuit-closer frame and supporting-guides. Fig. 10 is a plan view of the under side of the circuit-closer frame. Fig. 11 is an enlarged view, in side elevation, of a section of the stop-pin wheel and the circuit-closer, showing the circuit closed. Fig. 12 represents the switch and knobs or buttons connecting with the signals. Fig. 13 is a side elevation of the clock or time mechanism, illustrating the position of parts when the circuit is opened. Fig. 14 shows the position of the several parts when the circuit is closed; and Fig. 15 is a diagram, showing the connection and location of the wires.

A represents a clock, which may be of the marine or pendulum type of movement, and of any desired form of construction. To the clock-case are attached binding-posts $a$ $a'$, to which are attached the ends of the wire B of the main circuit, and thus include the clock-movement therein. To one binding-post, $a$, is attached a short wire, $b$, the opposite end of which is secured to a screw, $b'$, which serves to secure one end of the metal strip $b^2$ to block $b^3$, the opposite end of the metal strip $b^2$ being held in place by means of a screw, $b^4$, which extends through the block and forms a contact-point, $b^5$. To the binding-post $a'$ is attached a short wire, $c$, which is secured at its opposite end to a metal strip, $c'$, by means of a screw, $c^2$, the metal strip $c'$ being connected at one end to the plate $c^3$, to which latter is hinged a metallic arm, $c^4$, which is held in contact with the contact-point $b^5$ by means of a light spring, $c^5$. The free end of the spring-pressed arm $c^4$ extends within the plates of the clock-movement in close proximity to the first pinion, C, which is furnished with a cam, $C'$. As the pinion C makes one revolution every minute of time, the cam $C'$ operates to lift the outer end of the arm $c^4$ once every minute, and consequently breaks the electric circuit by moving the metallic arm away from the contact-point $b^5$. In order that the circuit may remain broken but an instant of time, or for only a small fraction of a minute, the arm $c^4$ is provided with a longitudinal slot, thus forming a narrow transverse strip on the end of the arm with which the cam engages. Thus it will be readily understood that the clock mechanism operates to automatically break the electric circuit during every successive minute of time. I have only illustrated one form of device for accomplishing this effect; but it is evident that other devices may be employed for this purpose, and many changes may be resorted to for the purpose of adapting the automatic circuit-breaker to different forms of clocks, and hence I would have it understood that I do not restrict myself to the particular mechanism shown and described for automatically opening and closing the circuit by the time mechanism of a clock.

The ends of the wire B which connect with the clock are attached to the screws or binding-posts D D', connected with the case of the time-signaling apparatus.

$D^2$ $D^3$ are electro-magnets, the wire of one helix, $D^2$, connecting with the wire B by the wire $d$, and the wire of the other helix, $D^3$, connecting with the battery-wire E of the main circuit, and also leading to all the bells or signals. The other battery-wire, F, connects with the other end of the wire B, leading to the clock, and from thence runs to the switch-board E', and is attached to the screw $E^3$, which connects with the battery, while to the screw $E^2$ is connected the wire $E^4$, which connects with a metal strip, F', attached to the rear side of the circuit-closer frame G.

Switch-lever H may be shifted to close the electric circuit through the hand buttons or knobs I I' $I^2$, which latter are placed in electrical connection with the several different signals, in order that the signals may be operated by hand in the event that it is required to signal the departure of late or special trains, or for purposes not contemplated by the regular schedule time for the running of trains.

Within the case of the signaling apparatus is placed a motor, J, which may be of any desired construction and operated by a weight, J', or by a spring or water or other power. When a weight or spring is employed an opening, $f$, is preferably made in the case for the reception of the squared end of the shaft on which the cord $f'$ is wound, in order that a key may be applied for winding up the motor, which latter may be constructed to run eight days or longer without rewinding. To the frame of the motor, or to any other suitable support, is pivoted a stop-lever, K, one end of which is provided with a hooked projection, K', which enters an opening in the frame of the motor and intercepts the fly $K^2$ of the motor, thereby serving to instantly stop the motor when the hooked end of the lever is allowed to move across the line of travel of the fly or fan $K^2$. A spring, $k$, serves to hold the lever K in a position to retain the motor against movement until the lever is moved in the opposite direction in opposition to the force of said spring.

L is an armature-lever, pivoted to a block or plate, $l$, the short arm of the armature being raised by a spiral spring, $l'$. The long arm of the armature has connected therewith, by a link, $l^2$, or other suitable device, an oscillating bar, L', the outer end of which is provided with a slot, $L^2$, for a purpose hereinafter described.

M is a stop-pin wheel of any desired size and formed of any suitable material. The stop-pins N may be arranged on the wheel in different ways, according to the size of the wheel and size of the stop-pins.

In the construction of apparatus in which I have illustrated my invention the wheel M is provided with three hundred and sixty driving-pins, N', projecting outwardly from the side of the rim $N^2$, said pins N' being secured at exactly equal distances apart, and serving as cogs for the engagement of the worm or spiral cam $N^3$, attached to the shaft $N^4$, the latter being revolved by means of a toothed wheel, $N^5$, attached thereto, which meshes with a toothed wheel, $N^6$, of the motor. Hence it will be observed that the stop-pin wheel is moved through a space equal to the distance between two of the pins N' at every complete revolution of the shaft N⁴.

To the shaft N⁴ is secured a cam, O, which engages with the outer end of the oscillating bar or rod L', and as the shaft revolves the cam serves to raise the bar and the long arm of the armature until the latter approaches sufficiently close to the electro-magnets to be attracted and held up thereby so long as the circuit is closed by the clock-movement. Shaft N⁴ is also provided with a disk, O', having an opening, O², formed therein.

The lower end of the stop-lever K rests against the side of the disk, and thus is prevented from engaging with the fan or fly of the motor and stopping the same until the disk has revolved and brought the opening O² to register with the end of the lever, allowing the spring $k$ to throw the lower end outward through the opening O² in the disk, when the upper hooked end is engaged with the fly, thus stopping the motor. When the clock-movement breaks the electric circuit the armature is released from the electro-magnets and falls, the outer end of the armature-lever striking the inclined edge or surface $o$ on the stop-lever K, thereby operating to withdraw its hooked end from engagement with the fly or fan and starting the motor, which in turn revolves the slotted disk O' and causes the latter to retain the stop-lever from contact with the fan of the motor throughout another revolution of the shaft N⁴. Hence the clock-movement operates to automatically break the circuit and release the armature once every minute.

The release of the armature serves to start the motor in operation, and the latter imparts a movement to the stop-pin wheel equal to the distance between the pins attached to its rim, and when said wheel has been moved the required distance the motor is automatically stopped and retained at rest until the clock has recorded another moment of time, when the circuit is again broken and the operation repeated. The periphery of the stop-pin wheel is provided with two sets of stop-pins, each set consisting of one thousand four hundred and forty-three stop-pins, which are arranged in a continuous spiral surrounding the wheel and forming four rows of pins. As there are one thousand four hundred and forty minutes in the twenty-four hours of a day, it will be observed that each set comprises a stop-pin for each minute of the day, and also three extra pins, for a purpose hereinafter described.

If it is desired to actuate but one signal, one series of stop-pins will suffice; but when it is necessary to operate two or more separate and independent signals—as, for instance, to indicate the departure of trains going east and trains going west—then two independent series of stop-pins, as illustrated in the drawings, are required. Additional series of stop-pins can be provided by increasing the width of the periphery of the wheel.

Stop-pins N may be formed of any desired material, and be made with sharp points, to be inserted in holes formed in the periphery of the stop-pin wheel; or the stop-pins may be made in the form of screws to be removably secured in the periphery of the wheel.

G is a frame attached to the case of the apparatus and located above the stop-pin wheel. The outer cross-bar, $p$, of the frame is provided with a down-hanger, P², which is preferably made laterally adjustable by means of the attaching-screws $p'$ entering the elongated slots $p^2$, formed in the upper end of the plate of the down-hanger. The lower end of the down-hanger is provided with a bearing, $p^3$, in which is journaled one end of the shaft N⁴.

The side bars, $p^4$, of frame G are provided with trackways or guides $p^5$, upon which is supported the reciprocating circuit-closer carriage Q, the sides of the latter resting upon said trackways or guides $p^5$. Upon the inner faces or sides of the guides $p^5$ are placed the metallic strips F² F³. The metal strip F² is employed when the apparatus is designed to work on an open circuit, and strip F³ when used for working on a closed circuit. Metal strip F² projects slightly above the surface of the trackway, to which it is attached, a slot being formed in the cross-bars $q$ of the reciprocating frame or carriage Q to receive the upwardly-projecting edge of the metal strip F². As heretofore stated, the metal strip F² is attached to the metal strip F', secured to the rear side of the frame G, and the latter connected with the battery-wire E⁴, whereby both metal strips F² and F³ are embraced in the electric circuit.

Reciprocating frame or carriage Q is furnished with four hinged or pivoted circuit-closers, R R' R² R³, each of which has secured to its outer or free end a metal plate, R⁴, which rests upon the upper edge of the metal strip F² when the circuit-closers are depressed to their lowest position. To the plates R⁴ are attached the ends of the flexible conductors $t^5\ t^8\ t^9\ t^7$, by means of screws $r^4$ or other suitable devices, said flexible conductors being preferably inserted through the eyes or loops $r^5$, formed in the upwardly-projecting arms $r^6$. To the ends of the reciprocating carriage Q are secured the standards $r^7$, in the upper ends of which are journaled the ends of an elongated crank, S, which latter bears against the several arms $r^6$. By raising the crank S all the hinged circuit-closers are raised simultaneously. To the end of the crank S, or formed integrally therewith, is connected an arm, S', which engages with the under side of a rod, S², secured between the arms $s\ s'$ of the short arm of the armature-lever. The rod $s^2$ is of sufficient length to accommodate the arm $s'$ of the reciprocating closer-carriage throughout the distance through which it travels. The short arm of the armature, being depressed, operates to depress the arm $s'$ and raise the several hinged or pivoted circuit-closers, the hinged circuit-closers of each set being so constructed that their stop-pins T T will be in line with each other, for a purpose hereinafter described.

A yielding metal strip, T', is attached to the central cross-bar of the reciprocating carriage Q, and beneath the hinged circuit-closers is provided with a cross-piece, $T^2$, while the free end $T^3$ projects outwardly beneath the metal strip $F^3$. When the hinged circuit-closers are raised the resiliency of the metal strip $T'$ operates to throw the free end thereof in contact with the metal strip $F^3$, connected with the battery, and close the circuit, and when the circuit-closers are depressed they operate to force the yielding circuit-closer $T'$ out of contact with the metal strip $F^3$, and thus break the circuit.

All of the several flexible conductors $t^5$ $t^6$ $t^7$ are provided on their outer or free ends with the open slotted metal tips $t$, which are perforated at $t'$ for the attachment of the conductors, and at their opposite ends provided with the open slots $t^2$, so that they may be readily inserted beneath the head of the screws $t^3$, connected with the signals by electric conductors, and placed in the circuit by tightening the screws. The conductor $t^6$ connects with the two conductors $t^8$ $t^9$, which connect with the middle and adjacent hinged circuit-closers. The flexible conductor $t^5$ connects with the screw or binding-post U, with which is connected the wire $U'$, leading to the east three-minute bell $U^2$. Conductor $t^6$ connects with the wire $U^3$, leading to the starting-bell $U^4$, and conductor $t^7$ connects with the wire $U^5$, leading to the west three-minute bell $U^6$.

The following is a description of the mechanism employed for reciprocating the circuit-closing carriage: Upon the axle of the stop-pin wheel is secured a pinion, $u$, which meshes with a toothed wheel, $u'$, journaled in a bracket, $u^2$. The wheel $u'$ having four times as many teeth as there are cogs in the pinion $u$, it follows that it will take four revolutions of the stop-pin wheel to impart a single complete revolution to the toothed wheel $u'$. To the shaft of the toothed wheel $u'$ is secured a cam, $u^3$, against which bears an arm, $u^4$, connected with or formed as a part of the rock-shaft $u^5$. The upper end of the rock-shaft $u^5$ is provided with an arm, $u^6$, which presses against one of the standards on the reciprocating circuit-closer carriage. Hence it will be understood that the carriage Q is caused to travel from one end of its frame to the other once during every four successive revolutions of the stop-pin wheel. A spring, V, is attached to the case of the apparatus, the free end $v$ of the spring being attached to the reciprocating carriage. When the carriage has been removed outward to the limit of its travel by the cam and arms on the rock-shaft the arm engaging with the cam is released therefrom and allows the spring V to retract the carriage O to its original starting-place. To the case are connected three circuit-closers, I $I'$ $I^2$, which are connected, respectively, with the several signals by means of the wires $w$ $w'$ $w^2$. These last-mentioned circuit-closers may be thrown into the battery-circuit by means of the switch, and thus enable the signals to be operated by hand and used when trains are late or "special," or at any time when the suspension of the regular signals is desired without making any change in the time or stop-pin wheel.

As heretofore stated, each set of stop-pins on the periphery of the wheel is composed of four spiral coils, the entire number of stop-pins in the four coils being one thousand four hundred and forty-three, or three in excess of the number of minutes in the twenty-four hours of a day, and hence the stop-pin wheel makes four revolutions during every twenty-four hours. The rim of the stop-pin wheel is divided arbitrarily into any desired number of sections. In the present form I have divided it into six sections, each section representing a particular hour of the day. In each of the six sections there are sixty driving-pins secured to the rim of the wheel, and these pins are numbered from left to right from zero to fifty-nine, thus furnishing a driving-pin for each minute of the hour. The stop-pins on the periphery of the wheel are arranged to correspond with the driving-pins—that is to say, in each one of the six sections on the periphery of the stop-pin wheel there are four rows of stop-pins for each independent set of driving-pins, and in each row there are sixty pins, excepting in the last section of the set there are sixty-three pins, which is necessary, as will hereinafter be described. The four sections of pins of sixty in a row, corresponding with the section of driving-pins on the rim of the wheel, represent four different hours of the day—that is, the first section of the set corresponds with the hour of 12 at night, the next outer section denotes the hour at 6 a. m, the next outer section 12 m., and the outer section 6 p. m.

Having described the construction and arrangement of parts of my invention, I will now proceed to describe its operation.

The apparatus having been properly set up and the connections made by the different wires hereinbefore referred to, the clock operates to open and close the electric circuit during each successive moment of time. We will now assume that the apparatus is to be used to automatically actuate the two signals for a train going east and a train going west, that the schedule time for the departure of the eastern train is 12.45 p. m., and the schedule time for the departure of the western train is 3.18 p. m. The stop-pin wheel is then set as follows to actuate the required signals: For the eastern-bound train it is necessary to withdraw the forty-fifth stop-pin, counting from left to right, in the third tier or row of pins, counting from the rear face of the periphery of the wheel toward its center, and in the first section of pins corresponding with the driving-pins on the rim of the wheel. The first section of pins is denoted by the letter $x$, and hence the pin that must be withdrawn is located in one of the four rows of stop-pins corresponding to said section, as that portion of the periphery of the wheel embracing section $x$ passes beneath the circuit-closers between the hours of 12 m. and 1 p. m.

Again, it will be observed that the row of pins which passes beneath the circuit-closers between the hours of 12 m. and 1 p. m. is the third row, counting from the rear side of the wheel toward its center, or the row designated by $x'$. The forty-fifth pin in that row is designated by $x^2$, and hence the latter pin must be withdrawn, and the stop-pin wheel is properly set to automatically actuate the signal for the departure of the eastern-bound train leaving at 12.45 p. m. It is now necessary to set the stop-pins for actuating an independent signal for indicating the departure of the western-bound train at 3.18 p. m.

It will be observed that the pin to be withdrawn is in the third section $x$ on the stop-pin wheel, and is in the third row of pins, counting from the center to the front, or in row $x$, and is the eighteenth pin, counting from the left to the right, in the first section, said pin being designated by the letter $y$. In order to properly set the stop-pin wheel so that it shall revolve in unison with the clock-movement, or to allow the stop-pins to be changed to correspond with any alternation in the schedule time, the adjustable bearing in which one end of the worm-shaft N is journaled is loosened and the shaft removed, thus enabling the required stop-pins to be withdrawn or inserted. Then the stop-pin wheel is adjusted on its axis and the shaft N placed in position, and the actuating-worm fixed thereto is inserted between the driving-pins, which correspond with the next succeeding minute of time, as indicated on the dial of the clock-movement. As the clock-movement breaks the circuit at the next succeeding moment the motor will be automatically started and move the stop-pin wheel in unison and in perfect time with the clock.

It will now be assumed that the stop-pin wheel is started at 12 m. at night. At every moment of time the clock mechanism operates to open and close the electric circuit in which the electro-magnets $D^2 D^3$ are located. As the circuit is broken the long arm of the armature L falls, while the short arm rises and allows the hinged circuit-closers to drop. The pins attached to the under side of the hinged circuit-closers fall upon the ends of the stop-pins, and thus prevent the closing of the circuits between any of the circuit-closers and the metal strip attached to the frame supporting the reciprocating carriage Q, in which the circuit-closers are hinged.

It will be observed that to close the circuit from the battery to any of the signals through the hinged circuit-closers it is necessary that the latter shall drop a sufficient distance to establish a contact between the metal strip on the frame and the metallic plates or strips attached to the hinged circuit-closers. The stop-pins on the wheel serve to prevent the closing of the circuit, and it is only when a stop-pin has been removed that the circuit-closers are allowed to fall and close the electric circuit. At the same time that the short arm of the armature is raised its long arm falls and strikes the inclined surface or edge on the stop-lever K, withdrawing the latter from engagement with the fan or fly of the motor and allowing the latter to start instantly and revolve shaft $N^4$. As the shaft $N^4$ revolves, the slotted disk thereon serves to retain the stop-lever K out of engagement with the gearing of the motor, while the cam on the shaft serves to gradually raise the armature and depress the arm connecting with the hinged circuit-closers and raise the latter from contact with the stop-pins. As the armature approaches the electro-magnets the latter attract the armature and hold it in contact with the cores of the magnet until the circuit is again broken by the clock mechanism. The shaft $N^4$, as it revolves, operates through the worm-disk to impart an intermittent rotary movement to the stop-pin wheel, and thereby move the next succeeding stop-pins beneath the pins of the circuit-closers.

It may be here mentioned that the time consumed by the motor in moving the stop-pin wheel is only a fraction of a moment, so that the wheel remains stationary a portion of the time.

The apparatus continues to be operated automatically in the manner above described, the wheel being moved a distance equal to the space between the two adjacent pins on the stop-pin wheel—once every successive minute. As the hinged circuit-closers must be retained in such relative position that the pins secured thereto will fall squarely upon the ends of the stop-pins, it follows that the circuit-closers must be moved transversely across the periphery of the wheel, that the circuit-closers may exactly register with the spiral rows of stop-pins on the wheel. This transverse reciprocation of the circuit-closers is effected by a rock-shaft and cam mechanism, hereinbefore described, which insures the perfect registry of the pins on the hinged circuit-closers with the spiral rows of stop-pins during every portion of the revolution of the stop-pin wheel.

The continued and successive opening and closing of the electric circuit by the clock operates, as hereinbefore described, to raise and let fall the circuit-closers and to revolve the stop-pin wheel step by step, and this operation is continued until the stop-pin wheel has revolved and brought that portion of the wheel from which the stop-pin located at $x^2$ has been withdrawn, which space is located directly beneath the pin T of the hinged circuit-closer R. The stop-pin wheel is adjusted so as to reach this point in its revolution at exactly 12.42 p. m., and as the clock mechanism registers the particular time the circuit is broken and all the hinged circuit-closers allowed to fall. All of said circuit-closers, with exception of circuit-closer R, having each a stop-pin to support them, will therefore be held out of contact with the metal plate $F^3$, while the stop-pin in line with circuit-closer R having been withdrawn allows the circuit-closer R to fall a greater distance than the others, so that the metal plate attached thereto will rest upon the edge of the metal plate F², thus closing the circuit from the battery through the hinged circuit-closer R, through its flexible conductor $t^5$ and wire U', and sound the bell U² at 12.42 p. m., or three minutes before the departure of the train going east. The electric circuit is then automatically closed and broken, as before, until the vacant space at $x^2$ registers with the pin T, attached to the hinged circuit-closer R', the pins operating with the two circuit-closers R and R' being located at such distance apart that three minutes will elapse between the sounding of the first and second alarms, and hence at three minutes subsequent to the sounding of the first alarm, or at 12.45 p. m., the circuit-closer R' falls and closes the circuit and establishes a connection with the starting-bell U⁴, and sounds the latter, denoting the starting-time of the east-bound train.

While I have arbitrarily fixed upon these particular signals, it is evident that they may be modified at pleasure.

While I have described the operation of the device to signal the departure of only one east-bound train in every twenty-four hours, it will be understood that the set of stop-pins for operating the signals of the east-bound train will be adjusted according to the number of trains going east every twenty-four hours, so that the signal or bell, one or more, placed in the waiting room or rooms of a railroad-station, will automatically signal the departure of the train, and also give any desired cautionary signal, that passengers may be in readiness to board the train. The stop-pin continues to revolve, and in the same manner closes the circuit between the hinged circuit-closers R² and R³ and metal strip F², and sounds the cautionary and starting bells for the western-bound train.

Any desired number of separate signals may be employed and operated with the utmost accuracy and precision. The stop-pins in the wheel may be readily adjusted to correspond with the schedule time for the departure of all the trains leaving any particular station.

The two separate and independent sets of stop-pins enable the apparatus to operate separate signals to indicate the departure of trains going east and west or in other different directions, and the signals will be operated with perfect accuracy without the necessity of any attendant.

At a union depot, where trains are leaving on different roads or in different directions, the stop-pin wheel should be provided with as many sets of stop-pins as there are different branches of road over which different trains pass in leaving the station, so that separate and independent signals can be employed for denoting the leaving-time of the several trains.

As heretofore stated, there are one thousand four hundred and forty-three stop-pins, or three more stop-pins than there are minutes in the twenty-four hours of a day. The three extra stop-pins are furnished for the following purpose: If it is desired to sound a starting-signal at 11.59 p. m., the proper pin is withdrawn, and as the warning-pin on the circuit-closer, which is situated forward of the starting-pin a distance corresponding to three minutes of time, falls into the space and sounds the three-minute signal, the wheel then turns, and were it not for the extra stop-pins the warning-pin would have no support, and hence would keep sounding the signal; but by providing the three extra stop-pins the warning-pin is provided with supports to allow of the regular automatic action of both the warning and starting pins on the circuit-closers. When the starting-pin has dropped on the 12 p. m stop-pin it is then automatically moved transversely across the row of stop-pins at the next movement of the stop-pin wheel, and falls upon the stop-pin, indicating 12.01 a. m. and the warning-pin upon stop-pin 12.04 a. m.

It is evident that many slight changes in the construction and arrangement of parts of my improved automatic time-signaling apparatus might be resorted to without departing from the spirit of my invention, and hence I would have it understood that I do not limit myself to the exact construction and arrangement of parts shown and described; but, Having fully described my invention, what I claim as new, and desire to secure by Letters Patent, is—

1. An automatic electric time-signaling apparatus consisting, essentially, of the following parts: first, clock mechanism adapted to break the circuit at any certain successive intervals of time; second, a wheel, cylinder, or disk provided with stop-pins corresponding in number to the number of times the circuit is to be opened by the clock during twenty-four hours; third, a circuit-closer adapted to close the circuit from the battery to the signals; fourth, an armature which actuates the circuit-closer; and, fifth, a motor adapted to actuate the stop-pin wheel, and provided with devices whereby it is started by the release of the armature, substantially as set forth.

2. The combination, with a wheel having any desired number of pins or cogs secured to its rim, a shaft provided at one end with a cam or worm which engages with said pins and revolves the wheel, and at the other end with a toothed wheel which is driven by a toothed wheel of a motor and a cam, of a slotted bar and an armature connected therewith by a link, whereby the rotation of said shaft operates to rotate the stop-pin wheel, and also to automatically raise the armature, substantially as set forth.

3. The combination, with a motor and stop-lever connected therewith, of a revolving shaft provided with a cam and slotted disk, and an armature and slotted bar connected therewith, substantially as set forth.

4. A stop-pin wheel provided with a set of pins equal in number to the minutes in the twenty-four hours of a day, substantially as set forth.

5. A stop-pin wheel provided with a stop-pin for every minute of the day, and arranged in spiral rows around the periphery of the wheel, substantially as set forth.

6. A stop-pin wheel provided with two or more sets of stop-pins, each set having a stop-pin for every minute of the day, and arranged in spiral rows around the periphery of the wheel, substantially as set forth.

7. The combination, with a stop-pin wheel or cylinder having its periphery provided with stop-pins for every minute of the day, of a circuit-closer and an armature for actuating the circuit-closer, substantially as set forth.

8. The combination, with a wheel or cylinder having spiral rows of stop-pins inserted in its periphery, of a circuit-closer frame and mechanism for moving said frame transversely across one of the spiral rows of stop-pins once in every complete revolution of said wheel, substantially as set forth.

9. The combination, with the stop-pin wheel, of a stationary frame provided with one or more metal strips connecting with the battery-circuit, and a reciprocating frame having circuit-closers hinged or pivoted thereto, substantially as set forth.

10. The combination, with the stop-pin wheel, of a stationary frame provided with one or more metal strips connecting with the electric circuit, of a reciprocating frame having circuit-closers hinged or pivoted thereto and flexible conductors attached at one end to said hinged circuit-closers and at opposite ends with buttons or binding-posts connected by wires with the signals, substantially as set forth.

11. The combination, with the reciprocating circuit-closer frame, of mechanism connected with the stop-pin wheel, and a rock-shaft for moving the frame in one direction, and a spring or weight for moving the frame in the opposite direction, substantially as set forth.

12. The combination, with a cam driven by mechanism connected with the axle of the stop-pin wheel, of a rock-shaft provided with an arm engaging with said cam and provided at its opposite end with an arm engaging with the reciprocating circuit-closed frame, substantially as set forth.

13. The combination, with the reciprocating frame or carriage and circuit-closer arms hinged or pivoted thereto, of a crank-arm for raising said circuit-closer arms simultaneously, substantially as set forth.

14. The combination, with the reciprocating circuit-closer frame and crank shaft or arm for raising the several circuit-closers, of a rod or bar connected with the short arm of the armature, and adapted to engage with an arm connected with said crank-shaft and operate the latter throughout any part of its travel, substantially as set forth.

15. The combination, with a revolving stop-pin wheel or cylinder, provided with a continuous row of removable stop-pins, of two independent and movable circuit-closers, each provided with pins which register with the same row of stop-pins in the stop-pin wheel, whereby a single stop-pin being withdrawn operates to close the circuit through said circuit-closers in succession and sound different alarms or signals, substantially as set forth.

16. The flexible conductors connecting with the circuit-closers, provided with metal tips provided with open slots in their outer ends, substantially as set forth.

17. The combination, with one or more sets of removable stop-pins arranged on a revolving wheel or cylinder, each set having a stop-pin for every minute of the twenty-four hours of a day, a circuit-closing device, and mechanism for attaching the signals in unison with a clock-movement, of hand circuit-closers and a cut-off, whereby the signals may be operated without disturbing the automatic signaling apparatus, substantially as set forth.

18. The combination, with a motor, of a stop-pin wheel provided with a continuous row of stop-pins, one for each minute of the day, and a row of driving pins or cogs placed at the same distance apart from each other as the stop-pins on the periphery of the wheel, substantially as set forth.

In testimony that I claim the foregoing I have hereunto set my hand.

WILLIAM H. SHUEY.

Witnesses:
  F. O. McCLEARY,
  VINTON COOMBS.